(12) United States Patent
Honda

(10) Patent No.: US 8,446,620 B2
(45) Date of Patent: May 21, 2013

(54) DATA PROCESSING APPARATUS AND DATA PROCESSING METHOD

(75) Inventor: Hideki Honda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 690 days.

(21) Appl. No.: 12/258,182

(22) Filed: Oct. 24, 2008

(65) Prior Publication Data

US 2009/0109475 A1   Apr. 30, 2009

(30) Foreign Application Priority Data

Oct. 31, 2007   (JP) ................................. 2007-283544

(51) Int. Cl.
*G06F 3/12* (2006.01)

(52) U.S. Cl.
USPC ....... 358/1.15; 358/1.13; 358/1.14; 358/1.16; 358/1.17; 715/204; 715/209; 715/243; 715/251

(58) Field of Classification Search
USPC ..... 358/1.15, 1.13, 1.14, 1.16, 1.17; 715/204, 715/209, 243, 251
See application file for complete search history.

(56) References Cited

U.S. PATENT DOCUMENTS

| 6,268,924 B1 * | 7/2001 | Koppolu et al. | 358/1.13 |
| 6,480,293 B1 * | 11/2002 | Bonikowski et al. | 358/1.15 |
| 6,509,974 B1 * | 1/2003 | Hansen | 358/1.12 |
| 7,043,688 B1 * | 5/2006 | Tsutsumi et al. | 715/255 |
| 2005/0243368 A1 * | 11/2005 | Sedky et al. | 358/1.16 |

FOREIGN PATENT DOCUMENTS

| JP | 11-242574 A | 9/1999 |
| JP | 2000-029641 A | 1/2000 |

OTHER PUBLICATIONS

XML Paper Specification, Working Draft 1.0.1.

* cited by examiner

*Primary Examiner* — Vu B Hang
(74) *Attorney, Agent, or Firm* — Canon USA Inc IP Division

(57) ABSTRACT

In order to display the more detailed print status of an electronic document having a tree structure, information about the tree structure is added to a print command. Furthermore, for information management, the information about the tree structure is associated with a corresponding page.

10 Claims, 15 Drawing Sheets

FIG. 7

| PRINT COMMAND |
|---|

FIRST PAGE

FDS : FDS1  COPY SOURCE FDS : NONE
FD : FD1  COPY SOURCE FD : NONE
FP : FP1  COPY SOURCE FP : NONE
  COPY NUMBER : 1

SECOND PAGE

FDS : FDS1  COPY SOURCE FDS : NONE
FD : FD2  COPY SOURCE FD : NONE
FP : FP1  COPY SOURCE FP : NONE
  COPY NUMBER : 1

THIRD PAGE

FDS : FDS1  COPY SOURCE FDS : NONE
FD : FD3  COPY SOURCE FD : FD1
FP : FP1  COPY SOURCE FP : FP1
  COPY NUMBER : 2

FOURTH PAGE

FDS : FDS1  COPY SOURCE FDS : NONE
FD : FD4  COPY SOURCE FD : FD2
FP : FP1  COPY SOURCE FP : FP1
  COPY NUMBER : 2

FIG. 8

| PAGE ID | FDS | FD | FP | COPY SOURCE FDS | COPY SOURCE FD | COPY SOURCE FP | COPY NUMBER |
|---|---|---|---|---|---|---|---|
| 1 | FDS1 | FD1 | FP1 | FDS1 | FD1 | FP1 | 1 |
| 2 | FDS1 | FD2 | FP1 | FDS1 | FD2 | FP1 | 1 |
| 3 | FDS1 | FD3 | FP1 | FDS1 | FD1 | FP1 | 2 |
| 4 | FDS1 | FD4 | FP1 | FDS1 | FD2 | FP1 | 2 |

| | |
|---|---|
| DEFINITION : | STATUS |
| NODE TYPE : | VALUE |
| DESCRIPTION : | PRINTER INFORMATION |
| FULL SCHEMA PATH : | \Printer.Information:Status |
| DATA TYPE : | BINARY |

FIG. 15

STATUS BINARY DATA

- PAGE NUMBER BEING PRINTED
- COPY NUMBER
- Fixed Document Sequence OF COPY SOURCE
- Fixed Document OF COPY SOURCE
- Fixed Page OF COPY SOURCE

DATA PROCESSING APPARATUS AND DATA PROCESSING METHOD

BACKGROUND OF THE INVENTION

1. Field of the Invention

The present invention relates to a data processing apparatus and a data processing method having a function of displaying a print status, for example, information about a document being printed.

2. Description of the Related Art

Printing systems generally include a color printer capable of outputting a color image, a host computer for controlling the color printer and generating print data, and a communication interface for connecting the color printer and the host computer. In such a host computer, an operating system operates, and various pieces of software are executed on the operating system. If a document created with application software is printed, the application software, a printer driver, and the operating system exchange data with one another by performing function call processing in accordance with a predetermined procedure so as to generate a printer command. The generated printer command is transferred to a printer, so that the document is printed. Some of such printer drivers communicate with a printer using a communication function given by an operating system so as to cause the printer to display information about a document being printed on the screen of the printer, thereby offering convenience to users (see, Japanese Patent Laid-open No. 2000-029641).

Microsoft Corporation has recently developed a new electronic document format, XPS (XML Paper Specification). XPS has a tree structure in which a single electronic document includes a plurality of documents, thereby achieving the logical management of these documents. For example, a single electronic document can include three documents, a word processing document, a spreadsheet document, and a presentation document. It is assumed that this electronic document is printed. At that time, if information about the electronic document being printed is displayed on a screen using a method in the related art, a page being printed and the number of printed pages can be displayed. However, it cannot be determined which of these documents included in the electronic document corresponds to the page being printed or a printed page.

In Microsoft Windows (registered trademark) Vista, a module called a filter pipeline for performing print processing of an XPS document can notify an OS print queue of a processing status using an OS print support function called a progress report every time each page of each document included in an XPS document is processed. By referring to a status field of the print queue, a user can check the page of a document being processed. However, in some cases, a page displayed in the status field as a page being processed does not correspond to a page being printed by a printer.

If the printing of a plurality of copies is set, each document included in an XPS document is copied by a filter pipeline. For example, two copies of an XPS document including only a single word processing document are printed, a word processing document copied by the filter pipeline is added so as to create an XPS document including two word processing documents. If a user checks a processing status notified by a progress report by referring to a status field of a print queue when the filter pipeline processes the second copy, a message "printing-fixed document sequence 1-fixed document 2-fixed page 1" is displayed. If one copy of the XPS document including two word processing documents is printed, the same message "printing-fixed document sequence 1-fixed document 2-fixed page 1" is displayed. Thus, a user cannot distinguish between these cases.

SUMMARY OF THE INVENTION

The present invention provides a print system capable of appropriately displaying a print status even when the printing of a plurality of copies is set.

A data processing apparatus according to an embodiment of the present invention includes a layout processing unit configured to receive electronic document data that has a tree structure and is stored in a spool file, perform page copy processing upon the electronic document data in accordance with a specified print setting so as to add a page, and output the electronic document data, a print command conversion unit configured to convert the electronic document data output from the layout processing unit into a print command interpretable by a print apparatus and add information about the tree structure of the electronic document data to the print command, a data communication processing unit configured to transmit the print command output from the print command conversion unit to the print apparatus and receive a print status from the print apparatus, and a print status display unit configured to display information about a page being printed on the basis of the print status received from the data communication processing unit and the information about the tree structure of the electronic document data.

A data processing apparatus according to an embodiment of the present invention includes a layout processing unit configured to, when printing of a plurality of copies of electronic document data that has a tree structure and is stored in a spool file is specified, copy each element included in the tree structure, store information about a copy source element and copy number information, and output the electronic document data.

A data processing method according to an embodiment of the present invention includes the steps of receiving electronic document data that has a tree structure and is stored in a spool file, performing page copy processing upon the electronic document data in accordance with a specified print setting so as to add a page, and outputting the electronic document data, converting the electronic document data into a print command interpretable by a print apparatus and adding information about the tree structure of the electronic document data to the print command, transmitting the print command to the print apparatus and receiving a print status from the print apparatus, and displaying information about a page being printed on the basis of the print status and the information about the tree structure of the electronic document data.

A data processing method according to an embodiment of the present invention includes the step of, when printing of a plurality of copies of electronic document data that has a tree structure and is stored in a spool file is specified, copying each element included in the tree structure, storing information about a copy source element and copy number information, and outputting the electronic document data.

As described previously, according to an embodiment of the present invention, the following advantages can be obtained. If an electronic document having a tree structure is printed, a page being printed can be displayed in association with elements included in the tree structure. If the printing of a plurality of copies of the electronic document is performed, a print status can be accurately understood and the copy number of an element being printed included in the tree structure can be displayed.

Further features of the present invention will become apparent from the following description of exemplary embodiments with reference to the attached drawings.

BRIEF DESCRIPTION OF THE DRAWINGS

FIG. 7 is a block diagram illustrating an example of a print command according to an embodiment of the present invention.

FIG. 8 is a block diagram illustrating a table used by a language monitor according to an embodiment of the present invention.

FIG. 14 is a block diagram illustrating an example of a private schema according to an embodiment of the present invention.

FIG. 15 is a block diagram illustrating an example of information stored in a private schema according to an embodiment of the present invention.

DESCRIPTION OF THE EMBODIMENTS

Embodiments of the present invention will be described in detail below with reference to the accompanying drawings.

[XPS Document Structure]

A brief description of XPS will be made so as to facilitate the understanding of this specification. XPS stands for XML Paper Specification developed by Microsoft Corporation as one of open-standard electronic document formats.

An XPS document has a tree structure including a FixedDocumentSequence (hereinafter, referred to as an FDS) as a root element and a plurality of elements. The FDS includes a plurality of FixedDocuments (hereinafter, referred to as FDs). Each of the FDs includes a plurality of FixedPages (hereinafter, referred to as FPs). An FDS, an FD, and an FP are each sometimes referred to as an XPS part. An FP includes the contents of a document page which are described in accordance with an XML format and are to be displayed or printed. Resources such as fonts and images used to describe the page contents can be commonly used among a plurality of FPs. An FDS, an FD, and an FP each can have the print setting thereof as a PrintTicket (hereinafter, referred to as a PT). The PT is obtained by describing in accordance with an XML format a print setting used when an XPS document is printed. Here, a print setting used when each FP is printed is obtained by merging the PT of an FDS, the PT of a parent FD including the FP to be printed, and the PT of the FP to be printed.

Figure 1:
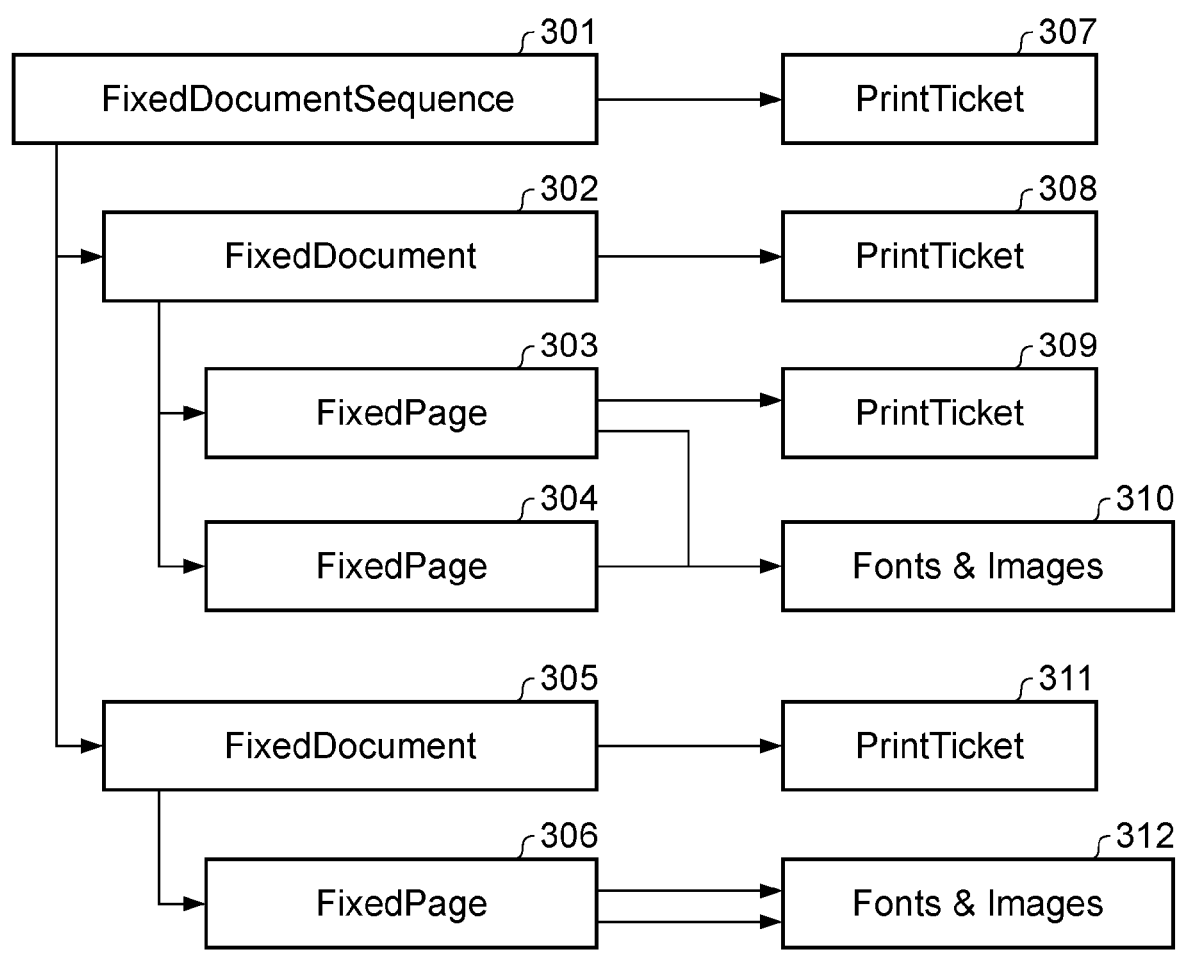
FIG. 1 is a conceptual diagram illustrating the logical structure of an XPS document.

FIG. 1 is a block diagram illustrating an exemplary logical structure of an XPS document. An XPS document has a tree structure including an FDS 301 as a root element. The FDS 301 includes an FD 302 and an FD 305 as child FDs. The FD 302 includes an FP 303 and an FP 304 as child FPs. The FD 305 includes an FP 306 as a child FP. The FDS 301, the FD 302, the FP 303, and the FD 305 store a PT 307, a PT 308, a PT 309, and a PT 311, respectively. Each of these PTs describes a print setting. Each of the FP 304 and the FP 306 stores no PT. The FP 303 and the FP 304 share a font/image resource 310. The FP 306 uses a font/image resource 312. For example, a PT used to print the FP 303 is obtained by merging the PT 307, the PT 308, and the PT 309.

As described previously, an XPS document can be easily understood by introducing the concept of a logical XPS part. Since an XPS document itself can be regarded as a byte stream, internal data of the XPS document is sometimes referred to as XPS data. Accordingly, an embodiment of the present invention will be described using these words "XPS part" and "XPS data".

[Configuration of Filter Pipeline]

Figure 4:
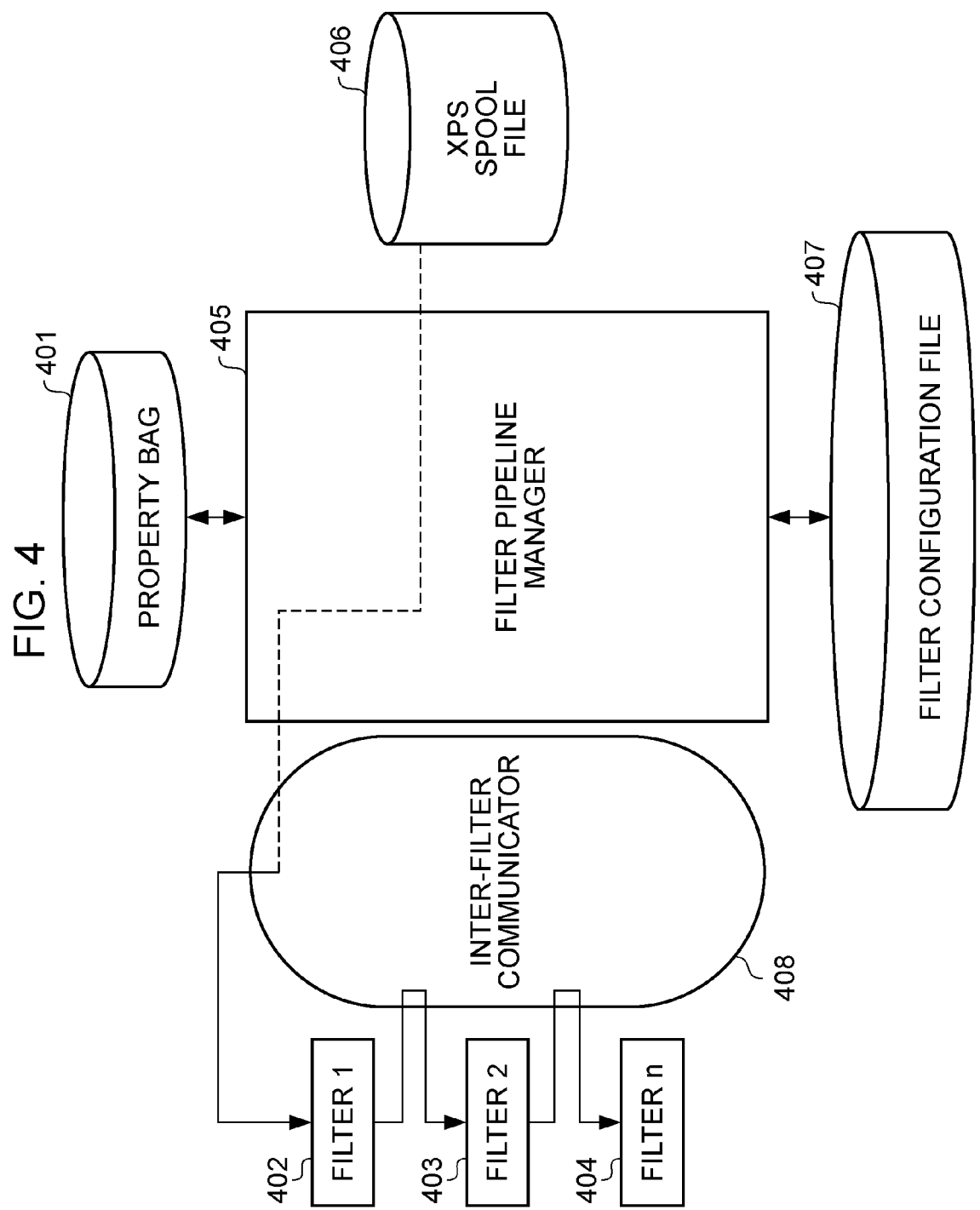
FIG. 4 is a block diagram illustrating a configuration of a filter pipeline.

The configuration of a filter pipeline will be described with reference to FIG. 4. A filter pipeline includes a plurality of filters for processing an XPS document. Filters 402, 403, and 404 are managed by a filter pipeline manager 405 through an inter-filter communicator 408 functioning as an interface.

An XPS spool file 406 stores an XPS document. The XPS spool file 406 is transmitted to the filters 402, 403, and 404 by the filter pipeline manager 405 so as to be processed.

A filter configuration file 407 describes these filters included in the filter pipeline.

A property bag 401 can store common data shared by these filters.

[Configuration of Print System]

Figure 2:
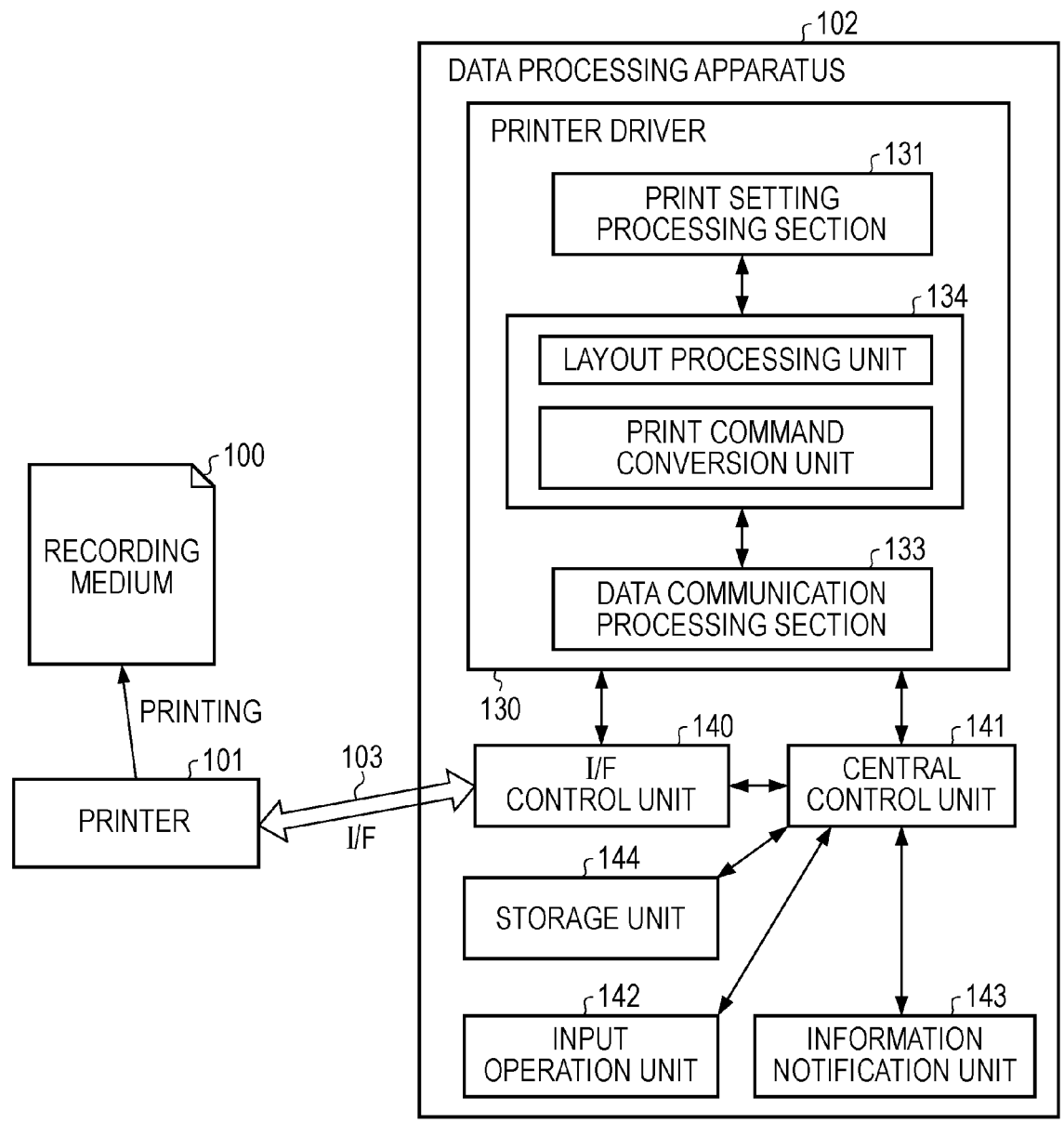
FIG. 2 is a block diagram illustrating an example of a print system according to an embodiment of the present invention.

FIG. 2 is a block diagram illustrating the configuration of a print system according to an embodiment of the present invention. A printer 101 that is an ink-jet printer for performing image forming forms an image on a recording medium 100 in response to a print command generated by a data processing apparatus 102 to be described later. Any type of printer may be used. In this case, however, an ink-jet color printer is used. In the data processing apparatus 102, an application creates a print job, and a printer driver generates a print command used for controlling the print operation of the printer 101 connected to the data processing apparatus 102 from spool data of the print job. In this embodiment, a personal computer is used as the data processing apparatus 102, and also has a function of receiving a print setting instruction from a user. The data processing apparatus 102 includes functional blocks 130, 131, 133, 134, 140, 141, 142, 143, and 144. An OS for controlling the data processing apparatus 102 is preinstalled in the data processing apparatus 102, and these functional blocks operate on the OS. In this embodiment, the OS is Windows (registered trademark) XP. However, another OS may be used. A communication interface 103 is a communication interface for connecting the data processing apparatus 102 and the printer 101. In this embodiment, a USB that is a serial interface is adopted as the communication interface. In addition, serial interfaces such as IEEE 1394, Ethernet (registered trademark), IrDA, IEEE 802.11, and power line interfaces, and parallel interfaces such as Centronics and SCSI interfaces may be used. Thus, any type of interface capable of achieving communication, for example, a wired/wireless interface, may be used. As described previously, a print system according to this embodiment is not a single apparatus, but has a configuration in which the data processing apparatus 102 and the printer 101 for performing image forming are connected via a bi-directional interface. However, an integral-type print system having a data processing function and a print function may be used. The functions of the printer 101 and the data processing apparatus 102 which are assumed not to be necessary to describe features of this embodiment will be omitted.

The central control unit 141 for controlling various functions of the data processing apparatus 102 corresponds to the function of a CPU. The input operation unit 142 includes various input apparatuses for reflecting the intention of a user on a print setting. The information notification unit 143 notifies a user of a print setting. As the notifying method, a display apparatus such as a monitor may be used, or sound may be generated. The interface control unit 140 functions as an interface for the data processing apparatus 102. The storage unit 144 stores an OS, an application program, and an instruction code of a printer driver. Data required to execute software is temporarily stored and read in the storage unit 144. For example, the storage unit 144 is a hard disk drive or a semiconductor memory. The printer driver 130 is software used to perform various print settings, generate print data, and control a printer on the data processing apparatus 102. A program for the printer driver 130 is executed by the central control unit 141, so that the functions of a print setting processing section 131, a print command generation section 134 including a layout processing unit and a print command conversion unit, and a data communication processing section 133 are performed. The print setting processing section 131 performs various print settings such as the paper sheet setting and the print quality setting. The print setting processing section 131 has a function of receiving an instruction or an input from a user, and displaying setting information for the user or notifying the user of the setting information. In the print command generation section 134, the layout processing unit performs the setting of the number of copies and layout processing upon a print job page created by an application, and the print command conversion unit converts print data that has undergone the layout processing into a print command. The print command created by the print command conversion unit is transmitted to the interface control unit 140 via the data communication processing section 133, and is then transmitted from the interface control unit 140 to the printer 101.

[Operation of Printer Driver]

Figure 3:
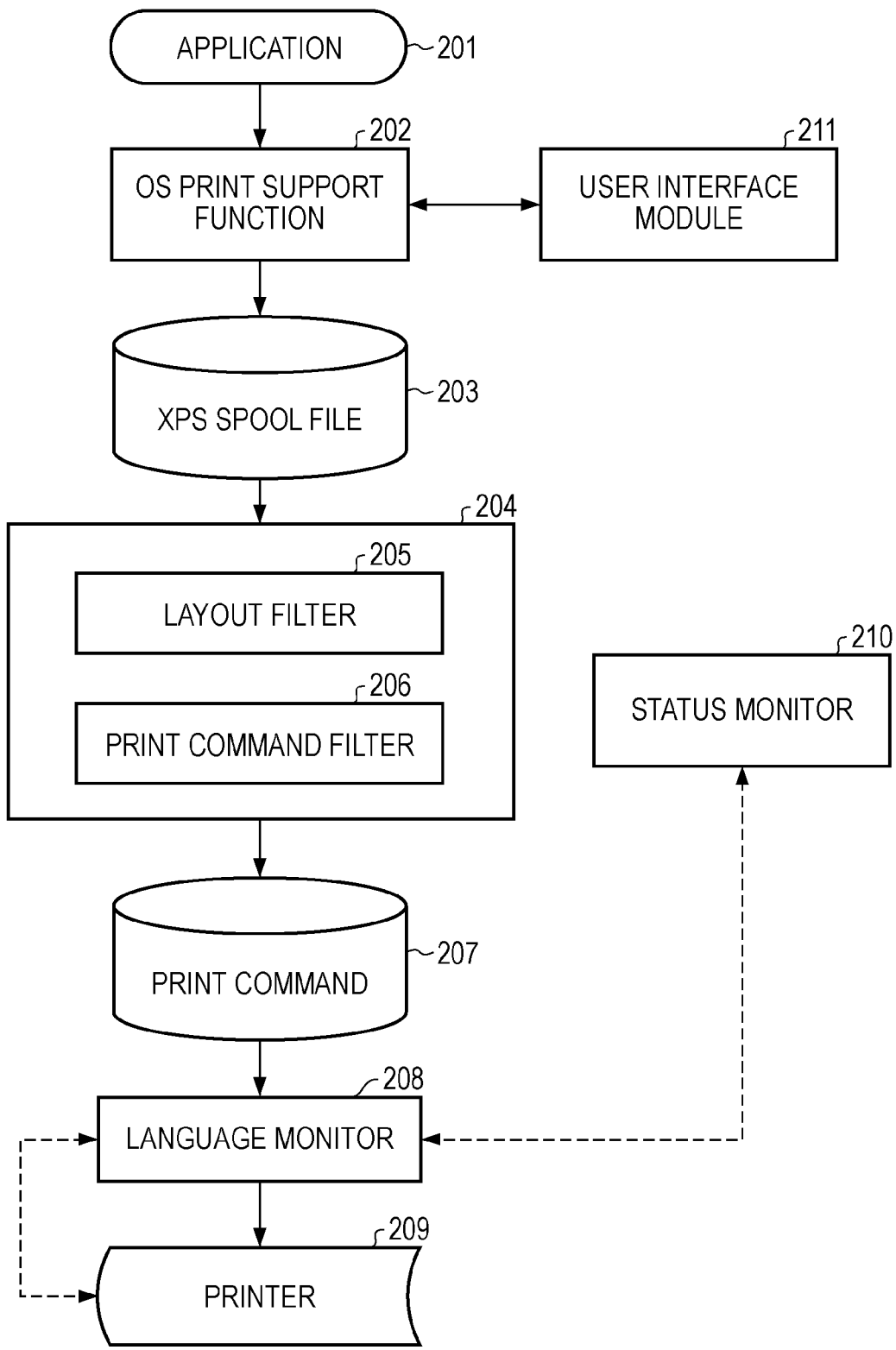
FIG. 3 is a block diagram illustrating an example of a printer driver according to an embodiment of the present invention.

FIG. 3 is a block diagram illustrating a conceptual configuration of the print system illustrated in FIG. 2 which includes an OS print support function and a printer driver according to an embodiment of the present invention. In a print system illustrated in FIG. 3, print data of each page of a document created with an application 201 is temporarily stored in an XPS spool file 203 using an OS print support function 202. A filter pipeline 204 of a printer driver converts the print data into a print command interpretable by a printer 209, and supplies the print command to the printer 209. The printer 209 performs print processing in response to the print command.

The filter pipeline 204 includes a layout filter 205 for page layout processing upon the XPS data and a print command filter 206 for converting the XPS data into a print command interpretable by the printer 209.

A user interface module 211 sets various attributes such as a sheet size, a print direction, and the number of copies. The user interface module 211 transmits print setting information including setting values of a plurality of print setting items to the application 201.

In printing a created document, the application 201 notifies the OS print support function 202 of starting/terminating a print operation, the print setting information transmitted from the user interface module 211, or starting/terminating a drawing operation of each document page. The OS print support function 202 stores the drawing contents of the application 201 and the print setting information in the XPS spool file 203.

The filter pipeline 204 including one or more filters reads the print setting information and XPS parts from the XPS spool file 203, converts the read information into a print command interpretable by the printer 209, and supplies the print command to the printer 209. The printer 209 performs print processing in response to the print command. The OS print support function 202 calls each filter when a spooled print job is despooled. The spooled XPS data is edited or is converted into a data format unique to the driver when passing through each filter of the filter pipeline 204, and is then finally converted into a print command interpretable by the printer 209. After all the pieces of XPS data included in a print job have been processed, or if the print job is cancelled, each filter of the filter pipeline 204 terminates the operation thereof. The filter pipeline 204 according to this embodiment includes the layout filter 205 functioning as the layout processing unit and the print command filter 206 functioning as the print command conversion unit.

The layout filter 205 receives the XPS data stored in the XPS spool file 203, performs page layout processing upon the XPS data on the basis of the print setting information, and outputs the XPS data that has undergone the layout processing. If the printing of a plurality of copies is set, the layout filter 205 copies XPS parts such as an FDS, an FD, and an FP so as to add a page. At that time, copy source FD information, copy source FP information, and copy number information are included in the added page.

The print command filter 206 receives the XPS data from the layout filter 205, converts the XPS data into a print command interpretable by the printer 209 on the basis of the print setting information, and outputs the print command. At that time, the print command filter 206 adds FDS information, FD information, and FP information to the print command and outputs the print command. If the printing of a plurality of copies is set and the layout filter 205 copies XPS parts so as to add a page, the print command filter 206 also adds copy source FDS information, copy source FD information, copy source FP information, and copy number information to the print command and outputs the print command. In a high-performance printer such as a page printer, if the types of print commands interpretable by a printer include XPS data, the print command filter 206 may output the received XPS data without processing it. Alternatively, the print command filter 206 may not be included in the printer driver.

A print command 207 output from the print command filter 206 is transmitted to a language monitor 208. The language monitor 208 interprets the print command 207, assigns a page ID to each page included in the print command, and transmits the print command to the printer 209. In addition, the language monitor 208 interprets the FDS information, the FD information, the FP information, the copy source FDS information, the copy source FD information, the copy source FP information, and the copy number information which are included in the print command 207, and creates a list in which each page ID is associated with the FDS information, the FD information, the FP information, the copy source FDS information, the copy source FD information, the copy source FP information, and the copy number information. If the printer 209 can interpret the XPS data, the language monitor 208 transmits the print command 207 to the printer 209 without adding the page ID and creating the list.

In response to a request transmitted from the language monitor 208, the printer 209 transmits the page ID of a page being printed to the language monitor 208. Using the page ID, the language monitor 208 can specify the FDS, the FD, the FP, the copy source FDS, the copy source FD, the copy source FP, and the copy number information corresponding to the page being printed by referring to the list. If the printer 209 can interpret the XPS data, the printer 209 transmits the FDS, the FD, the FP, the copy source FDS, the copy source FD, the copy source FP, and the copy number information corresponding to the page being printed to the language monitor 208 in response to a request transmitted from the language monitor 208.

A status monitor 210 communicates with the language monitor 208 and displays a current print status for a user. Here, the print status includes information about the occurrence of an error such as a "no sheet" error, information about the amount of ink remaining, and information about the page number of a page being printed. In addition to these pieces of information, the status monitor 210 according to an embodiment of the present invention can display the FDS, the FD, the FP, the copy source FDS, the copy source FD, the copy source FP, and the copy number information corresponding to the page being printed.

The printer 209 functioning as an output device interprets the print command 207 transmitted from the language monitor 208 and forms an image on a print sheet.

A case in which two copies of a two-page XPS document are printed in the print system illustrated in FIG. 3 will be described. The application 201 sets the printing of two copies using the print setting function of the user interface module 211 via the OS print support function 202. The application 201 starts the printing of the XPS document including a plurality of pages using obtained print setting information. Document print data and the print setting information which are obtained by the application 201 are stored in the XPS spool file 203 via the OS print support function 202.

Figure 5:
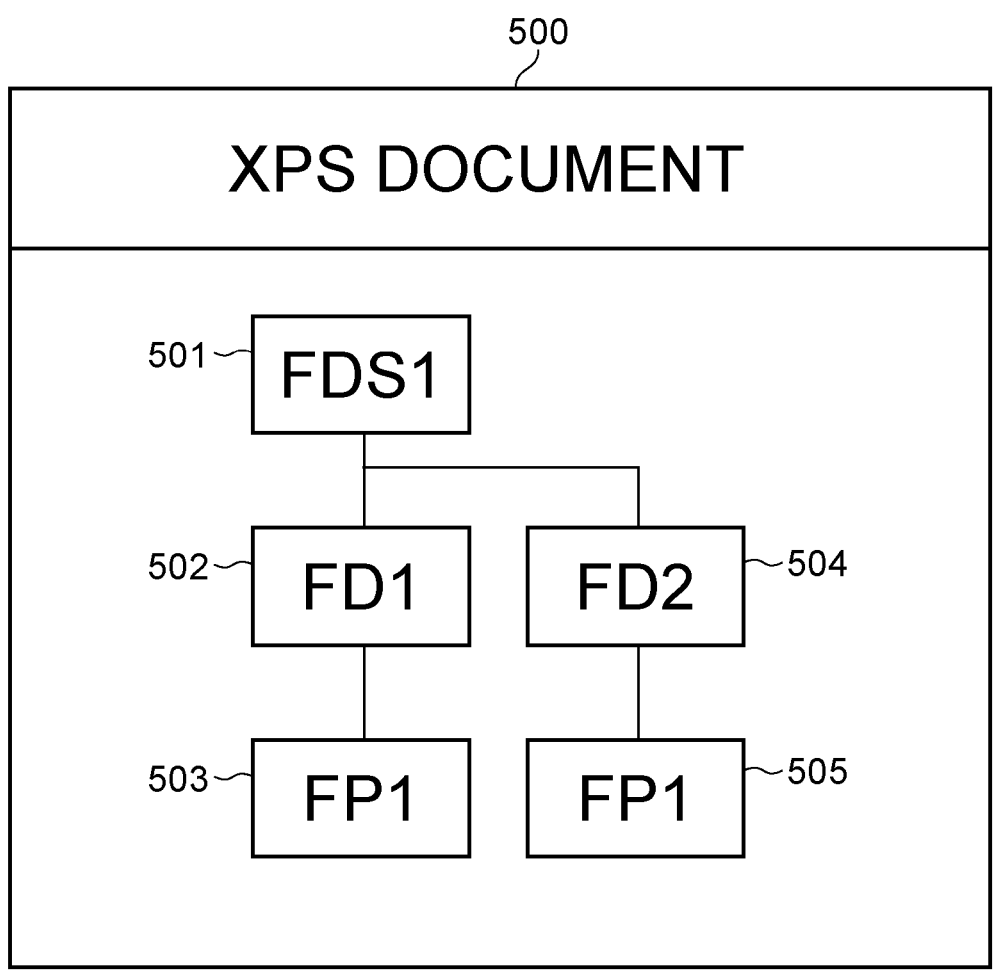
FIG. 5 is a block diagram illustrating an example of an XPS document according to an embodiment of the present invention.

FIG. 5 is a conceptual diagram illustrating an XPS document that is created by the application 201 and is then stored in the XPS spool file 203. An XPS document 500 includes a single FDS, that is, an FDS1 501. The FDS1 501 includes two FDs, that is, an FD1 502 and an FD2 504. The FD1 502 includes a single FP, that is, an FP1 503. The FD2 504 includes a single FP, that is, an FP1 505.

Referring back to FIG. 3, if the pages of the XPS document start to be spooled in the XPS spool file 203, the OS print support function 202 activates the filter pipeline 204. The layout filter 205 refers to the print setting information in which the number of copies is set to two, and copies the FDs and the FPs so as to add pages. At the same time, the layout filter 205 adds the copy source FD information, the copy source FP information, and the copy number information.

Figure 6:
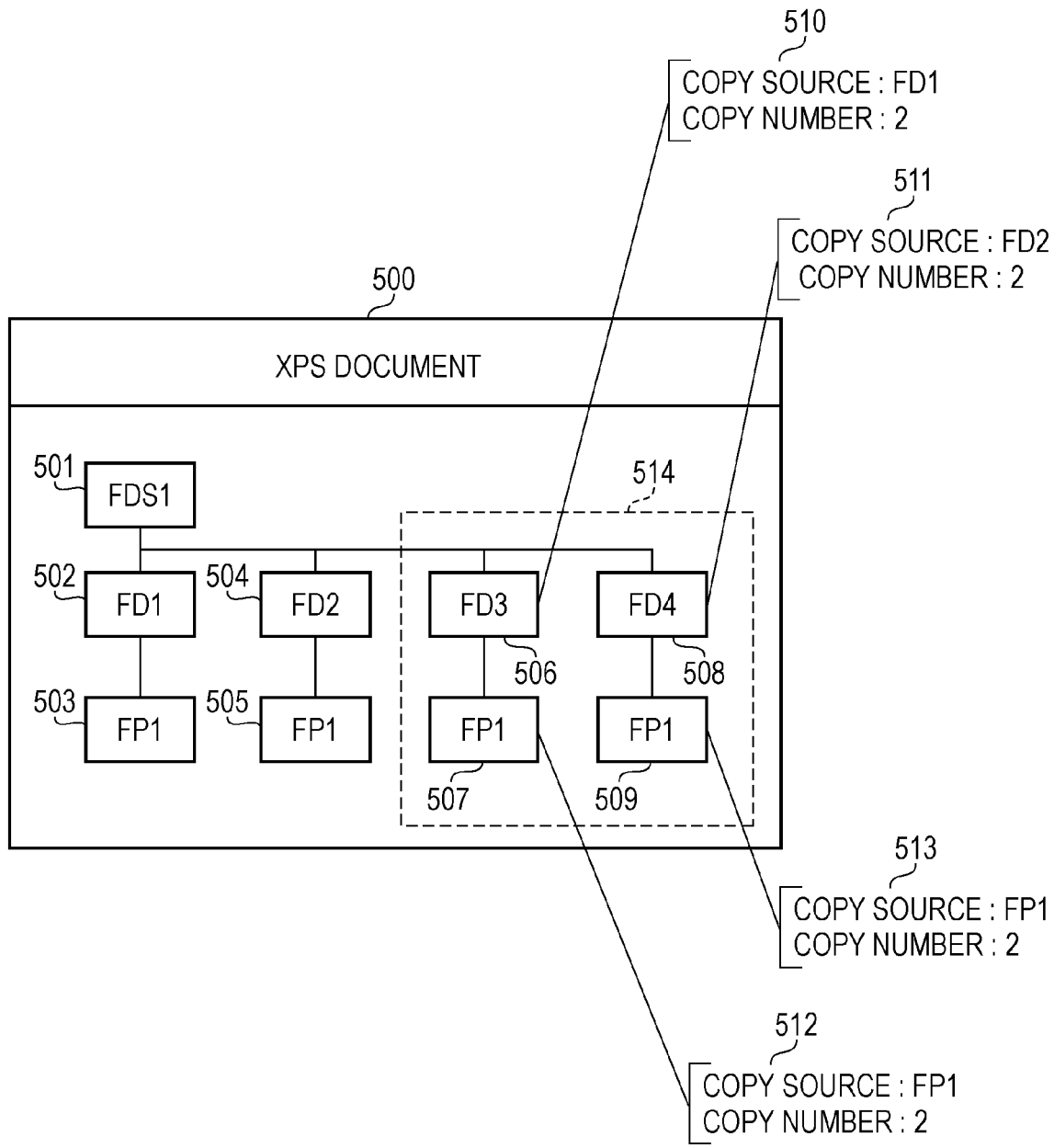
FIG. 6 is a block diagram illustrating an example of an XPS document according to an embodiment of the present invention.

FIG. 6 is a conceptual diagram illustrating an XPS document in which pages are added by copying the FDs and the FPs. In FIG. 6, the XPS document 500 to the FP1 505 have already been described with reference to FIG. 5, and the description thereof will be therefore omitted. An area 514 surrounded by a dotted line includes the FDs and the FPs obtained by copying copy source FDs and copy source FPs and adding the copied FDs and the copied FPs. An FD3 506 and an FD4 508 are copied from the FD1 502 and the FD2 504, respectively. An FP1 507 and an FP1 509 are copied from the FP1 503 and the FP1 505, respectively. The FD3 506, the FD4 508, the FP1 507, and the FP1 509 have pieces of information 510, 511, 512, and 513, respectively. Each of these pieces of information 510 to 513 includes copy source information and copy number information, and may be stored in a PT or a property bag.

Referring back to FIG. 3, subsequently, the print command filter 206 converts the received XPS spool file 203 into the print command 207 interpretable by the printer 209. At the time of conversion, the FDS information, the FD information, and the FP information are added to the print command 207. Since the XPS spool file 203 includes the pieces of information 510 to 513 added by the layout filter 205, the print command filter 206 adds the pieces of information 510 to 513 to the print command 207.

FIG. 7 is a conceptual diagram illustrating the print command 207 in which the FDS information, the FD information, the FP information, and the pieces of information 510 to 513 are added. FIG. 7 illustrates a print command for four pages each of which includes corresponding ones of the FDS information, the FD information, the FP information, and the pieces of information 510 to 513. The format of a command may be any format capable of displaying information, and the description thereof will be omitted.

Each of first to fourth pages includes the FDS information, the FD information, and the FP information.

The first and second pages are not copied and added pages that are created for the printing of a plurality of copies. Accordingly, the items of the copy source FDS, the copy source FD, and the copy source FP indicate "none", and the item of the copy number indicates "1".

The third and fourth pages are copied and added pages. Accordingly, the copy source FD information and the copy source FP information are set for these pages, and the item of the copy number indicates "2".

Referring back to FIG. 3, the language monitor 208 interprets the print command 207 so as to obtain corresponding ones of the FDS information, the FD information, the FP information, and the pieces of information 510 to 513 for each page, and adds a page ID for each page to the print command 207. The language monitor 208 creates a table so as to manage these pieces of information.

FIG. 8 illustrates an example of a table created by the language monitor 208. A first page 701, a second page 702, a third page 703, and a fourth page 704 are presented in the table. Since the first page 701 and the second page 702 are not copied pages, an FDS, an FD, and an FP are the same as a copy source FDS, a copy source FD, and a copy source FP, respectively and the copy number indicates 1. The third page 703 and the fourth page 704 are copied and added pages. The FD and the copy source FD of the third page 703 are the FD3 and the FD1. The FD and the copy source FD of the fourth page 704 are the FD4 and the FD2. In both of the third page 703 and the fourth page 704, the copy number indicates 2.

Referring back to FIG. 3, the printer 209 receives the print command 207, and performs printing. In response to a request transmitted from the language monitor 208, the printer 209 transmits the page ID of a page being printed to the language monitor 208. The language monitor 208 can check the FDS, the FD, the FP, the copy source FDS, the copy source FD, the copy source FP, and the copy number corresponding to the page being printed by referring to the table illustrated in FIG. 8. For example, if the transmitted page ID is 3, it can be determined that the FDS, the FD, the FP, the copy source FDS, the copy source FD, the copy source FP, and the copy number corresponding to the page ID 3 are the FDS1, the FD3, the FP1, the FDS1, the FD1, the FP1, and the number of 2, respectively.

Figure 9:
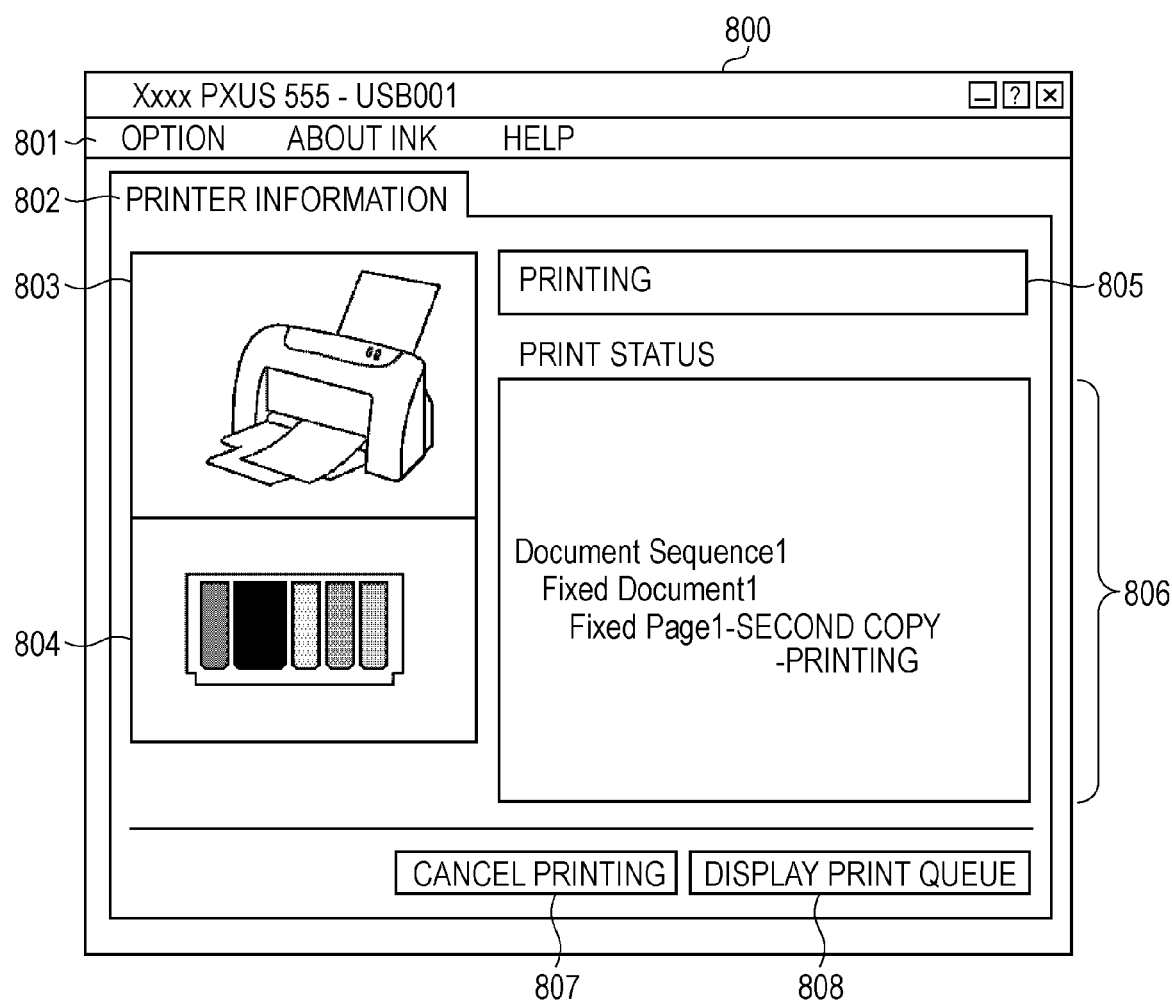
FIG. 9 is a block diagram illustrating an example of a status monitor according to an embodiment of the present invention.

The status monitor 210 communicates with the language monitor 208, and displays a current print status for a user. For example, if the third page is being printed by the printer 209, as illustrated in FIG. 9, a status monitor 800 displays a message indicating that the second copy of the FP1 of the FD1 is being printed in a print status display area 806. The status monitor 800 may include a task bar 801, a printer information tab 802, a printer status display area 803, an ink level display area 804, a printer status message display area 805, the print status display area 806, a printing cancel button 807, and a print queue display button 808.

Thus, the FDS information, the FD information, and the FP information of an XPS document are added to a print command. If the printing of a plurality of copies is set, the FDS information, the FD information, the FP information, the copy source FDS information, the copy source FD information, the copy source FP information, and the copy number information of an XPS document are added to a print command. A language monitor associates a corresponding page ID with these pieces of information. Consequently, the more detailed print status of the XPS document being printed can be displayed.

In this embodiment, a language monitor associates each page ID with the above-described pieces of information. However, a printer may perform the processing.

[Process of Layout Filter]

Figure 10:
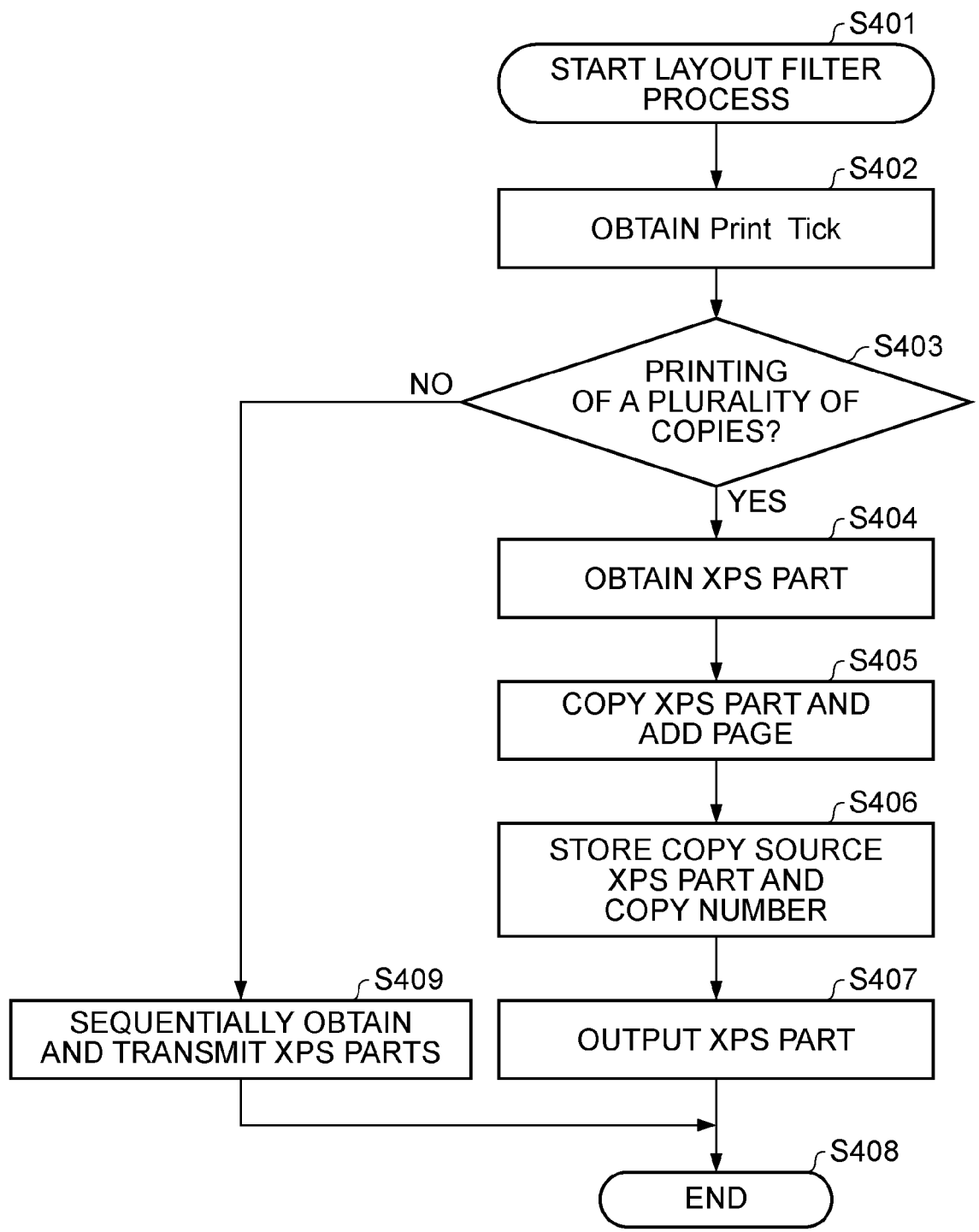
FIG. 10 is a flowchart illustrating a layout filter process according to an embodiment of the present invention.

The process of a layout filter will be described with reference to FIG. 10. FIG. 10 is a flowchart illustrating an example of a layout filter process. In step S401, the layout filter process starts. In step S402, the layout filter 205 acquires a PT. In step S403, the layout filter 205 determines whether the printing of a plurality of copies is set. If the printing of a plurality of copies is set, the process proceeds to step S404. In step S404, the layout filter 205 acquires XPS parts such as an FDS, an FD, and an FP. In step S405, the layout filter 205 copies these XPS parts for the printing of a plurality of copies so as to add a page to an XPS document. In step S406, copy source FDS information, copy source FD information, copy source FP information, and copy number information are stored in the PT or a Property Bag. In step S407, the layout filter 205 outputs these XPS parts. In step S408, the layout filter process ends. In step S409, the layout filter 205 performs no XPS part copy processing and no page addition processing since the printing of a plurality of copies is not set. The layout filter 205 sequentially acquires XPS parts and transmits the acquired XPS parts. The output XPS data is transmitted to the next filter.

[Process of Print Command Filter]

Figure 11:
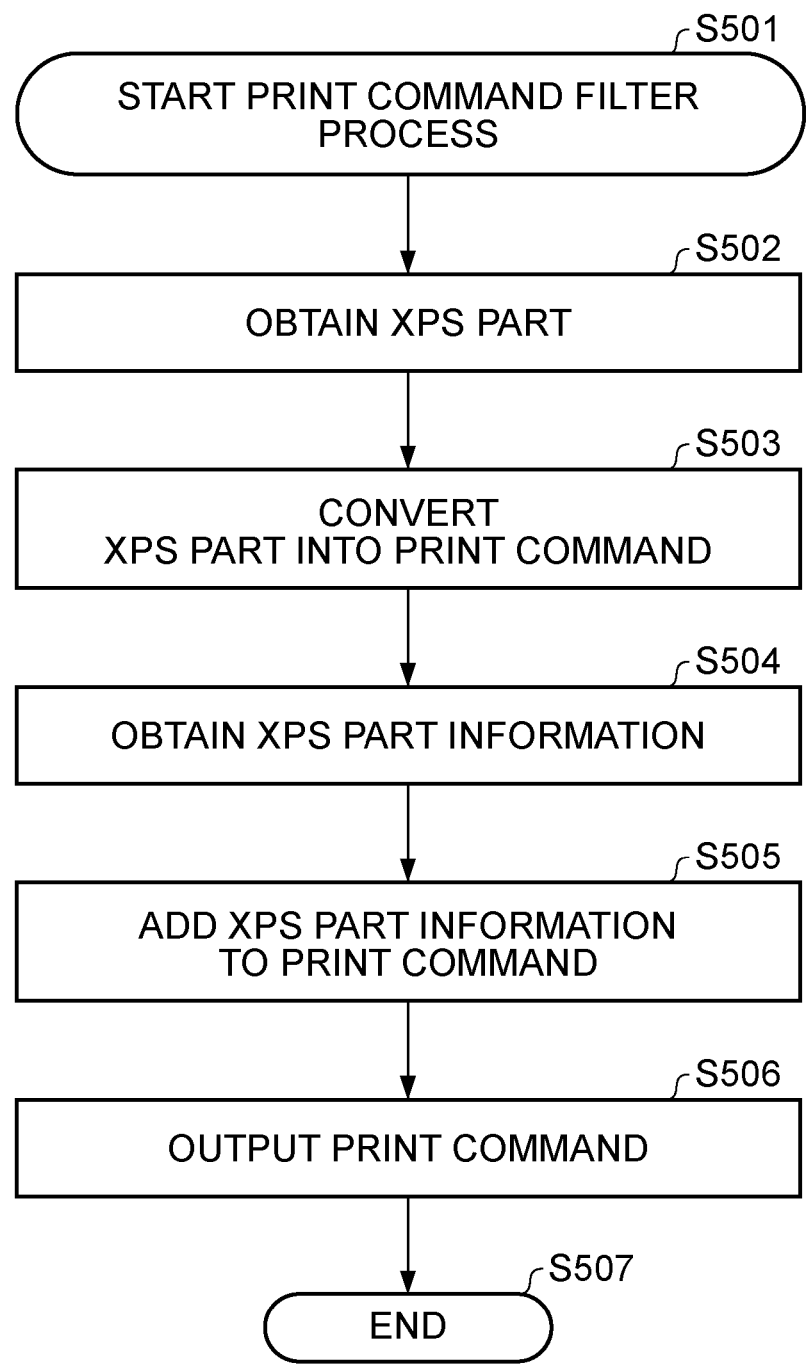
FIG. 11 is a flowchart illustrating a print command filter process according to an embodiment of the present invention.

The process of a print command filter will be described with reference to FIG. 11. FIG. 11 is a flowchart illustrating an example of a print command filter process. In step S501, the print command filter process starts. In step S502, the print command filter 206 acquires XPS parts. In step S503, the print command filter 206 converts the acquired XPS parts into a print command. In step S504, the print command filter 206 acquires XPS part information. In step S505, the print command filter 206 adds the acquired XPS part information to the print command. In step S506, the print command filter 206 outputs the print command. In step S507, the print command filter process ends. The output print command is transmitted to a language monitor via an OS spooler.

[Process of Language Monitor]

Figure 12:
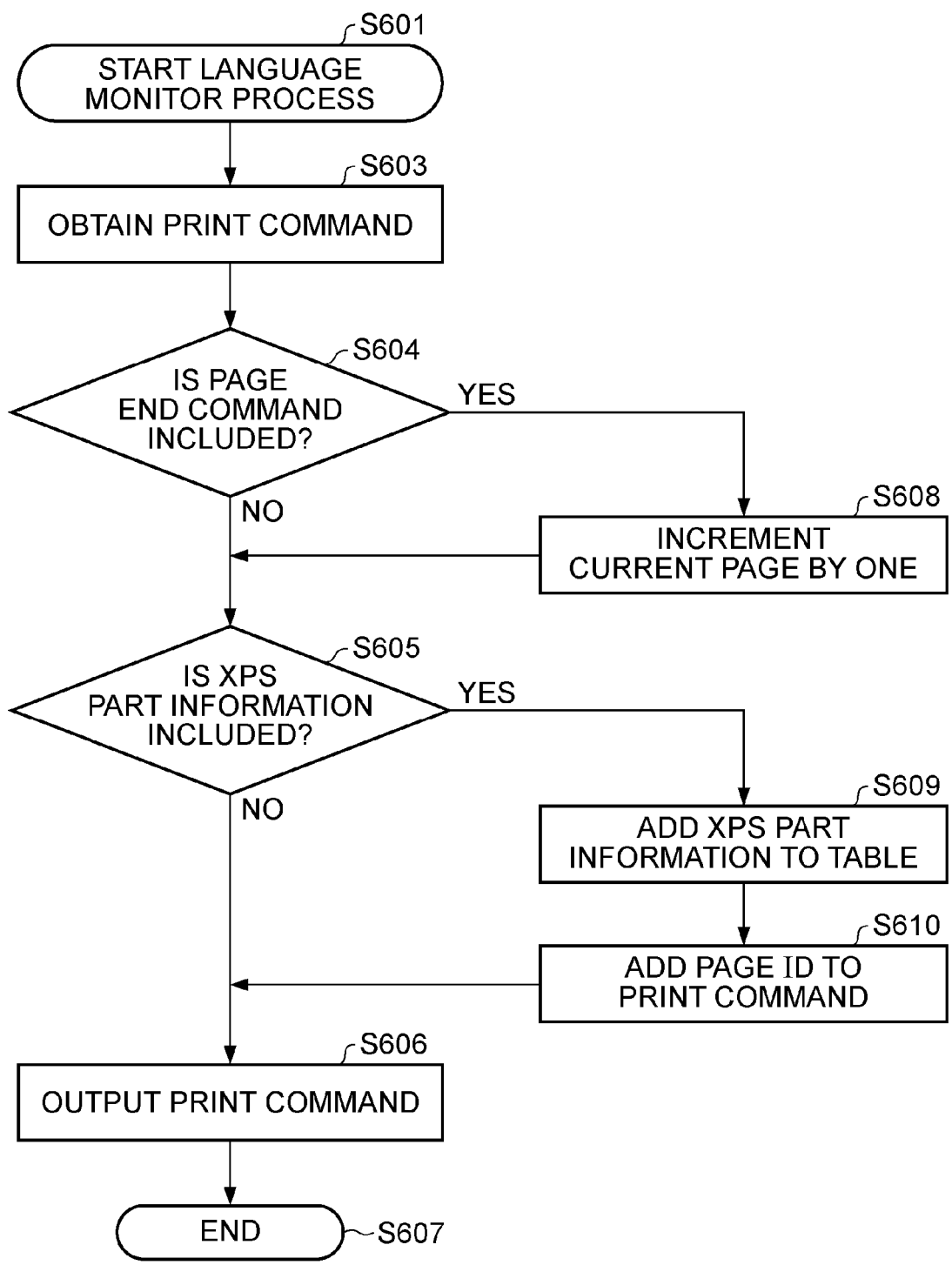
FIG. 12 is a flowchart illustrating a language monitor process according to an embodiment of the present invention.

The process of a language monitor will be described with reference to FIG. 12. FIG. 12 is a flowchart illustrating an example of a language monitor process. A spooler calls the language monitor 208. Subsequently, in step S601, the language monitor 208 starts the language monitor process. In step S603, the language monitor 208 acquires a print command. In step S604, the language monitor 208 determines whether a page end command is included in the print command. If the page end command is included in the print command, in step S608, the language monitor 208 increments a current page number by one. The process proceeds to step S605 in which the language monitor 208 determines whether XPS part information is included in the print command. If the XPS part information is included in the print command, in step S609, the language monitor 208 adds the XPS part information to a table. In step S610, the language monitor 208 adds a page ID to the print command. At that time, the page ID of a number that is the same as the current page number is set. In step S606, the language monitor 208 outputs the print command. In step S607, the process ends. The output print command is transmitted to a printer. The spooler calls the language monitor 208 until all the print commands are transmitted or the printing is canceled, so that the process from step S601 to step S607 is repeated.

[Process of Communication between Language Monitor and Status Monitor]

Figure 13:
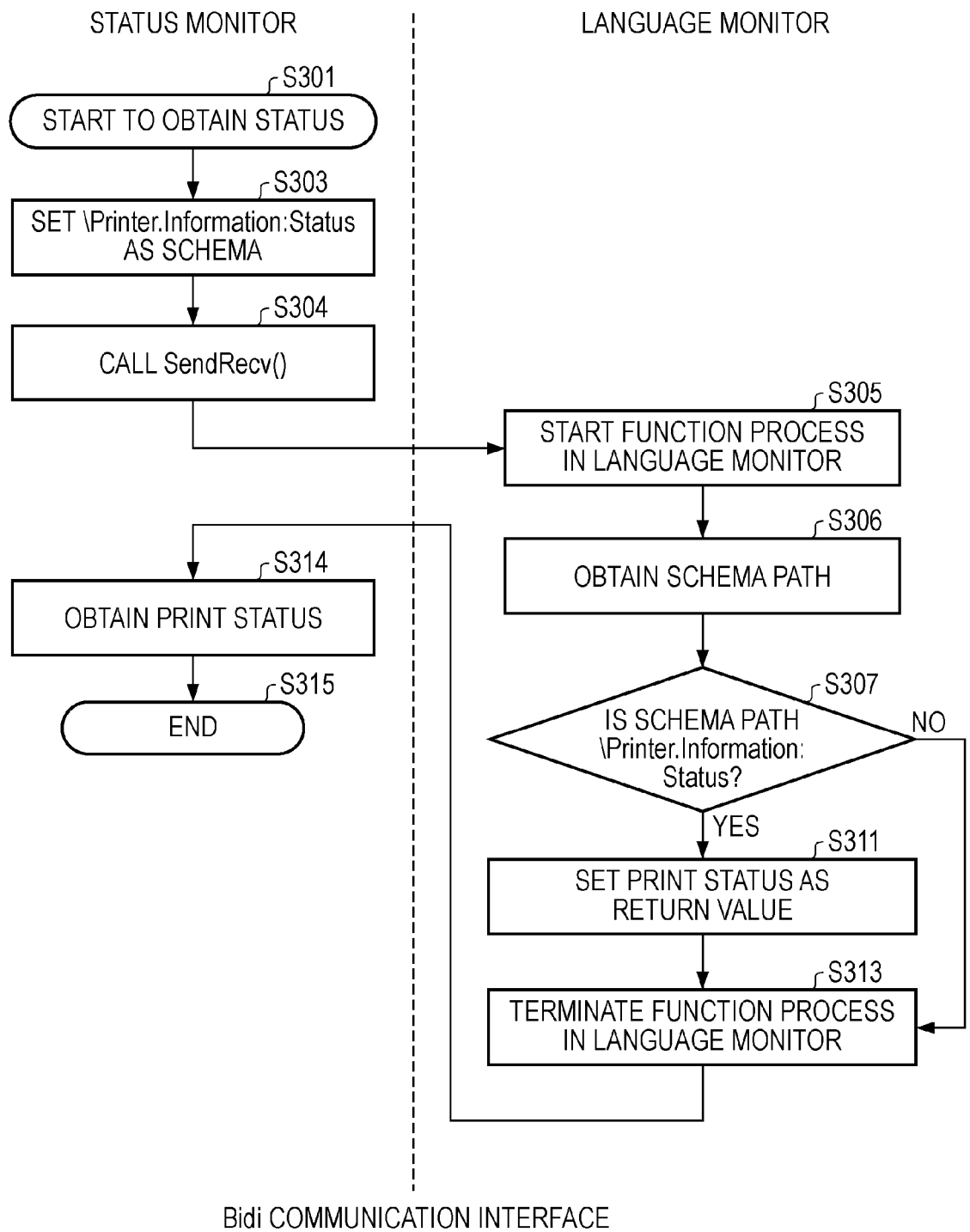
FIG. 13 is a flowchart illustrating a communication process according to an embodiment of the present invention between a status monitor and a language monitor.

The process of communication between a language monitor and a status monitor will be described with reference to FIG. 13. FIG. 13 is a flowchart illustrating an example of the process of communication between a language monitor and a status monitor. Referring to FIG. 13, the language monitor 208 and the status monitor 210 communicate with each other using the Bidi Communication Interface (hereinafter referred to as Bidi) that is a known function of Windows (registered trademark) XP. The status monitor 210 starts the process in step S301. In step S303, the status monitor 210 sets a schema \Printer.Information:Status as an argument. In step S304, the status monitor 210 calls a Bidi SendRecv function. The schema set in step S303 will be described later with reference to FIGS. 14 and 15.

If the SendRecv function is called in step S304, the function of the language monitor 208 is called in step S305 so as to start the process of the language monitor 208. In step S306, the language monitor 208 acquires a scheme. In step S307, the language monitor 208 determines whether the schema is the same as \Printer.Information:Status. If the schema is the same as \Printer.Information:Status, the process proceeds to step S311 in which the language monitor 208 sets a print status as a return value. Subsequently, in step S313, the process ends. If the process of the language monitor 208 ends in step S313, the process proceeds to step S314 in which the SendRecv function is transmitted from the language monitor 208 to the status monitor 210. As a result, the status monitor 210 acquires the print status. Then the process ends at step S315.

A private schema used in Bidi communication by a status monitor and a language monitor will be described with reference to FIGS. 14 and 15. FIG. 14 is a diagram illustrating an example of the definition of a private schema. The path of a schema is /Printer.Information:Status. In this example, binary data is used.

FIG. 15 is a diagram illustrating an example of information stored in binary data. Pieces of information about the page number of a page being printed, the copy number of a copy being printed, a copy source FDS, a copy source FD, and a copy source FP are stored.

In this embodiment, as a method of communication among a status monitor, an application, and a language monitor, Bidi is used. However, any communication method capable of achieving interprocess communication may be used.

Figure 16:
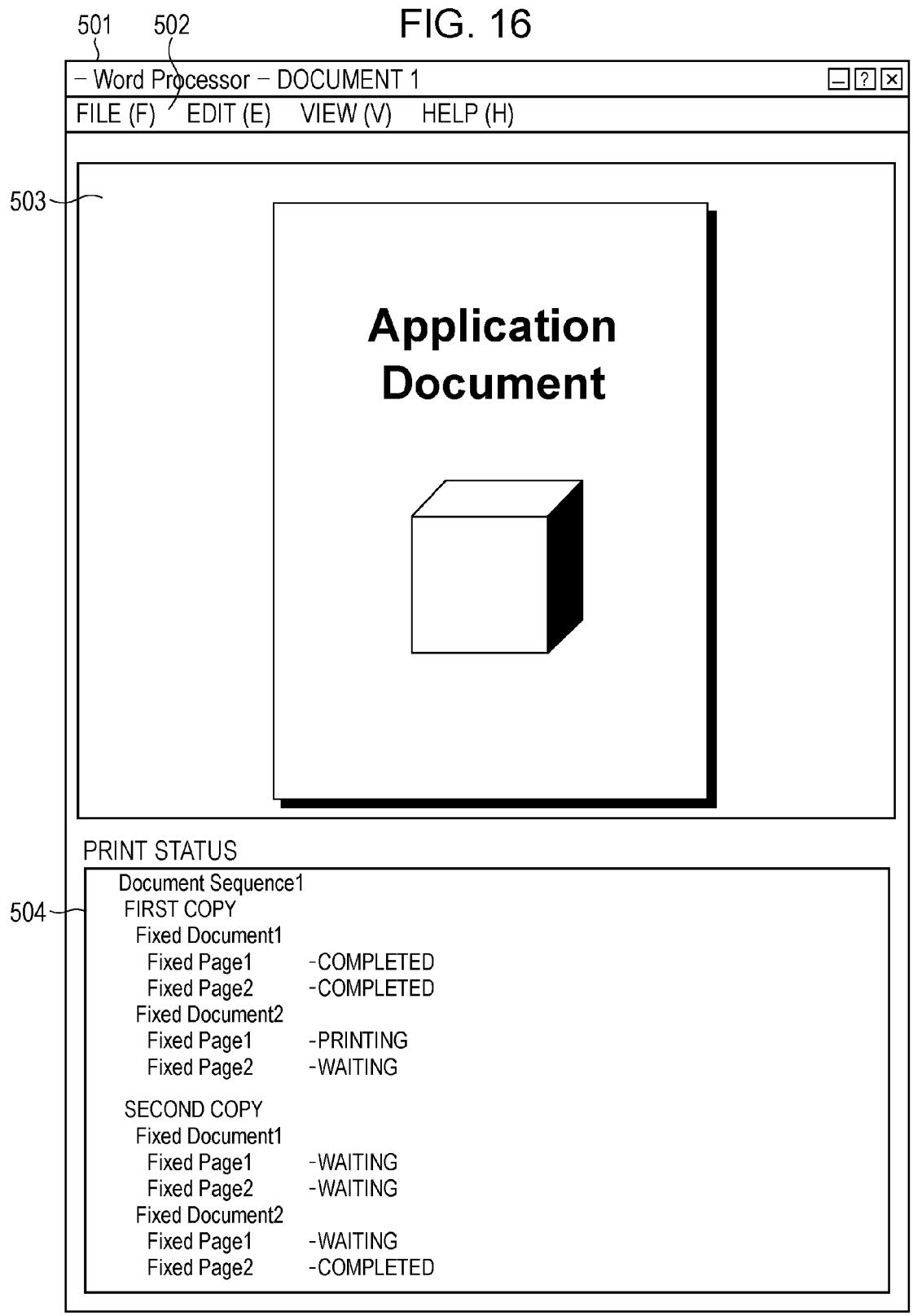
FIG. 16 is a block diagram illustrating an example of an application according to an embodiment of the present invention.

FIG. 16 is a diagram illustrating an exemplary case in which an application for creating an XPS document displays a print status instead of a status monitor. An application 501 communicates with a language monitor using Bidi so as to acquire a print status. The schema described with reference to FIGS. 14 and 15 is used in the Bidi communication. The application 501 displays the acquired print status on a display portion 504. It should be noted that not only information about a current page being printed but also pieces of information about a printed page and a page waiting to be printed are displayed. The season why the application 501 can display these pieces of information is that the application 501 itself creates an XPS document and can therefore understand the number of pages included in the XPS document.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-283544 filed Oct. 31, 2007, which is hereby incorporated by reference herein in its entirety.

What is claimed is:

1. A data processing apparatus comprising:
a layout processing unit configured to receive electronic document data that has a tree structure and is stored in a spool file, perform page copy processing upon the electronic document data in accordance with a specified print setting including a number of copies so as to add a page in a case where a plurality of copies of the electronic document data are specified, and output the electronic document data;
a print command conversion unit configured to convert the electronic document data output from the layout processing unit into a print command interpretable by a print apparatus and add information about the tree structure of a copy source of the electronic document data to the print command;
a data communication processing unit configured to manage page number information and the information about the tree structure of the copy source corresponding to each of the page number information, transmit the print command output from the print command conversion unit to the print apparatus and receive a print status including the page number information from the print apparatus; and
a print status display unit configured to display information which shows the tree structure of the copy source of the electronic document data corresponding to a page being printed by the print apparatus on the basis of the print status including the page number information received from the data communication processing unit and the information about the tree structure of the copy source the electronic document data which is managed by the data communication processing unit.

2. The data processing apparatus according to claim 1, wherein the data communication processing unit has a table used for associating the information about the tree structure of the electronic document data which is added to the print command with the page being printed in the display apparatus.

3. A data processing method comprising:
receiving electronic document data that has a tree structure and is stored in a spool file, performing page copy processing upon the electronic document data in accordance with a specified print setting including a number of copies so as to add a page in a case where a plurality of copies of the electronic document data are specified, and outputting the electronic document data;
converting the electronic document data into a print command interpretable by a print apparatus and adding information about the tree structure of a copy source of the electronic document data to the print command;
managing page number information and the information about the tree structure of the copy source corresponding to each of the page number information;
transmitting the print command to the print apparatus and receiving a print status including the page number information from the print apparatus; and
displaying information which shows the tree structure of the copy source of the electronic document data corresponding to a page being printed by the print apparatus on the basis of the print status including the page number information and the information about the tree structure of the copy source the electronic document data which is managed by the data communication processing unit.

4. A non-transitory computer readable medium for controlling a data processing apparatus, the medium comprising:
computer-executable instructions for receiving electronic document data that has a tree structure and is stored in a spool file, performing page copy processing upon the electronic document data in accordance with a specified print setting including a number of copies so as to add a page in a case where a plurality of copies of the electronic document data are specified, and output the electronic document data;
computer-executable instructions for converting the output electronic document data output into a print command interpretable by a print apparatus and add information about the tree structure of a copy source of the electronic document data to the print command;
computer-executable instructions for managing page number information and the information about the tree structure of the copy source corresponding to each of the page number information, transmit the output print command output to the print apparatus and receive a print status including the page number information from the print apparatus; and
computer-executable instructions for displaying information which shows the tree structure of the copy source of the electronic document data corresponding to a page being printed by the print apparatus on the basis of the print status including the received page number information and the information about the tree structure of the copy source the electronic document data.

5. The data processing apparatus according to claim 1, wherein the tree structure of the copy source of the electronic document data includes at least one of a fixed document Sequence, a fixed document, and a fixed page.

6. The data processing apparatus according to claim 1, wherein the print command conversion unit and the data communication processing unit use filter.

7. The data processing apparatus according to claim 1, wherein the electronic document data is in an XPS format.

8. The data processing method according to claim 3, wherein the tree structure of the copy source of the electronic document data includes at least one of a fixed document Sequence, a fixed document, and a fixed page.

9. The data processing method according to claim 3, wherein the print command conversion unit and the data communication processing unit use filter.

10. The data processing method according to claim 3, wherein the electronic document data is in an XPS format.

\* \* \* \* \*